(12) United States Patent
Yamamoto (10) Patent No.: US 10,505,660 B2
(45) Date of Patent: Dec. 10, 2019

(54) ROUTE SWITCHING DEVICE, ROUTE SWITCHING SYSTEM, AND ROUTE SWITCHING METHOD

(71) Applicant: NEC CORPORATION, Tokyo (JP)

(72) Inventor: Tetsuya Yamamoto, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/743,299

(22) PCT Filed: Jul. 20, 2016

(86) PCT No.: PCT/JP2016/003395
§ 371 (c)(1),
(2) Date: Jan. 10, 2018

(87) PCT Pub. No.: WO2017/013875
PCT Pub. Date: Jan. 26, 2017

(65) Prior Publication Data
US 2018/0212707 A1 Jul. 26, 2018

(30) Foreign Application Priority Data
Jul. 23, 2015 (JP) ................................ 2015-145965

(51) Int. Cl.
*H04B 10/07* (2013.01)
*H04J 14/02* (2006.01)
(Continued)

(52) U.S. Cl.
CPC .......... *H04J 14/0287* (2013.01); *H04B 10/07* (2013.01); *H04L 45/22* (2013.01); *H04Q 11/0005* (2013.01); *H04Q 2011/0081* (2013.01)

(58) Field of Classification Search
CPC .. H04B 10/07; H04J 14/0287; H04J 14/0212; H04Q 11/0005
See application file for complete search history.

(56) References Cited

U.S. PATENT DOCUMENTS

2002/0044315 A1* 4/2002 Sugawara ........... H04J 14/0204
398/45
2003/0138252 A1* 7/2003 Paiam ................ H04Q 11/0005
398/49
(Continued)

FOREIGN PATENT DOCUMENTS

CN  1702989 A  11/2005
CN  102035597 A  4/2011
(Continued)

OTHER PUBLICATIONS

International Search Report for PCT/JP2016/003395 dated Oct. 4, 2016 [PCT/ISA/210].
(Continued)

*Primary Examiner* — Dzung D Tran
(74) *Attorney, Agent, or Firm* — Sughrue Mion, PLLC (57) ABSTRACT

A route switching device includes a first selection section for outputting a first main signal, a second selection section for outputting a first switching command signal, a first transmitter transmitting an inputted signal, a second transmitter, a first receiver, a second receiver, a first monitor for outputting an abnormality notification if an abnormality in a second main signal is detected, and outputting a first switching command notification if second information is included in a second switching command signal, a second monitor, and a third selection section for obtaining a second main signal from a selected receiver. The first selection section and the second selection section switches a selection destination when a first switching command notification is input. The second selection section outputs a switching command signal including second information when an abnormality notification is input. The third selection section switches a selection source when an abnormality notification is input.

18 Claims, 6 Drawing Sheets

(51) Int. Cl.
    *H04L 12/707*     (2013.01)
    *H04Q 11/00*      (2006.01)

(56)            References Cited

U.S. PATENT DOCUMENTS

2003/0189920 A1    10/2003  Erami et al.
2007/0086332 A1     4/2007  Way et al.
2010/0111527 A1*    5/2010  Kimura ............... H04J 14/0212
                                                        398/49
2011/0292814 A1*   12/2011  Sugahara ................ H04L 43/00
                                                        370/248
2018/0234200 A1*    8/2018  Bottari ................ H04J 14/0204

FOREIGN PATENT DOCUMENTS

CN          103051374 A      4/2013
JP         2003-069521 A     3/2003
JP         2010-161750 A     7/2010
JP         2012-175123 A     9/2012
JP         2013-243559 A    12/2013

OTHER PUBLICATIONS

Written Opinion for PCT/JP2016/003395 dated Oct. 4, 2016 [PCT/ISA/237].
Communication dated Feb. 18, 2019 from the European Patent Office in application No. 16827442.1.
Communication dated Sep. 3, 2019 from the China National Intellectual Property Administration in counterpart Application No. 201680043318.5.

* cited by examiner

FIG. 1

ROUTE SWITCHING DEVICE 1

FIG. 2

ROUTE SWITCHING DEVICE, ROUTE SWITCHING SYSTEM, AND ROUTE SWITCHING METHOD

CROSS REFERENCE TO RELATED APPLICATIONS

This application is a National Stage of International Application No. PCT/JP2016/003395 filed Jul. 20, 2016, claiming priority based on Japanese Patent Application No. 2015-145965 filed Jul. 23, 2015, the contents of all of which are incorporated herein by reference in their entirety.

TECHNICAL FIELD

The present invention relates to route switching devices, route switching systems, and route switching methods, in particular, to a route switching device, a route switching system, and a route switching method for transmitting and receiving an optical signal via a first route and a second route each of which has a redundant route.

BACKGROUND ART

In recent years, high-speed and large-capacity systems are being developed for undersea cable systems. Along with the development, a system configuration of the undersea cable systems is also becoming complicated, and cases requiring partial redundancy on the land are also increasing.

In a general undersea cable system, when a route is switched to a redundant route, there has been employed a method of performing switching by transferring information on an automatic switching control signal using a K1 byte and a K2 byte of a synchronous digital hierarchy (SDH) overhead between switching devices with use of a data communication network (DCN) line for transponders. However, in a system configuration in which only a partial section has a redundant configuration, as exemplified by route diversity, a transponder is not installed at an intermediate station, and it is impossible to transfer switching information.

In view of the above, PTL 1 discloses a route switching device, in which, when an abnormality such as communication disruption is detected, a receiving route (A route) in its own device is switched from a currently used route to a redundant route, while a signal level of an optical signal to be output from a currently used route is set low and a signal level of an optical signal to be output from a redundant route is set high in a transmitting route (B route). In a device transmitting and receiving an optical signal to and from a route switching device, a route in each of the A route and the B route is automatically switched from a currently used route to a redundant route because a signal level of an optical signal inputted from the currently used route in the B route is low, and a signal level of an optical signal inputted from the redundant route is high. This makes it unnecessary to install a communication function of a control system for transferring switching information in each route switching device.

CITATION LIST

Patent Literature

[PTL 1] Japanese Patent Application Laid-Open Publication No. 2012-175123

SUMMARY OF INVENTION

Technical Problem

However, in the technique of PTL 1, a route is switched from a currently used route to a redundant route in the B route although a failure does not occur in the B route.

The present invention has been made in view of the above-described problem, and it is an object of the present invention to provide a route switching device, a route switching system, and a route switching method that allow only a route with the failure to be automatically switched from a currently used route to a redundant route when a failure occurs in one of the routes in a transmission system including a first route and a second route each of which has a redundant route.

Solution to Problem

In order to achieve the above-described object, a route switching device according to an exemplary aspect of the present invention includes first selection means for selecting one of first transmission means and second transmission means, and outputting a first main signal to selected transmission means; second selection means for selecting one of the first transmission means and the second transmission means, and outputting a first switching command signal to selected transmission means; the first transmission means and the second transmission means for transmitting an input signal to a counterpart device; first receiving means for splitting a signal received from the counterpart device and outputting split signals to first monitor means and third selection means; second receiving means for splitting a signal received from the counterpart device and outputting split signals to second monitor means and the third selection means; the first monitor means and the second monitor means for monitoring a second main signal when the second main signal has been inputted, generating an abnormality notification and outputting the abnormality notification to the second selection means and the third selection means if an abnormality is detected, monitoring a second switching command signal when the second switching command signal has been inputted, and generating a first switching command notification and outputting the first switching command notification to the first selection means and the second selection means if second information is included in the second switching command signal; and the third selection means for obtaining the second main signal from selected receiving means, wherein, in a normal state, the first selection means selects the first transmission means, the second selection means selects the second transmission means and outputs the first switching command signal including first information, and the third selection means selects the first receiving means, the first selection means switches a selection destination when the first switching command notification has been inputted, the second selection means outputs a switching command signal including second information when the abnormality notification has been inputted, and the second selection means switches a selection destination when the first switching command notification has been inputted, and the third selection means switches a selection source when the abnormality notification has been inputted.

In order to achieve the above-described object, a route switching system according to an exemplary aspect of the present invention includes the above-described first route switching device for transmitting the first main signal and the first switching command signal, and receiving the second main signal and the second switching command signal; and the above-described second route switching device for transmitting the second main signal and the second switching command signal, and receiving the first main signal and the first switching command signal.

In order to achieve the above-described object, a route switching method according to an exemplary aspect of the present invention, the route switching method for a route switching device, the route switching device including first selection means for outputting a first main signal to selected transmission means; second selection means for outputting a first switching command signal to selected transmission means; first transmission means and second transmission means for transmitting an inputted signal to a counterpart device; first receiving means for splitting a signal received from the counterpart device and outputting split signals to first monitor means and third selection means; second receiving means for splitting a signal received from the counterpart device and outputting split signals to second monitor means and the third selection means; first monitor means for monitoring a signal inputted from the first receiving means; second monitor means for monitoring a signal inputted from the second receiving means; and third selection means for obtaining a second main signal from selected receiving means, the route switching method including: in a normal state, causing the first selection means to select the first transmission means, causing the second selection means to select the second transmission means and to output the first switching command signal including first information, causing the first receiving means to receive the second main signal, causing the second receiving means to receive a second switching command signal, and causing the third selection means to select the first receiving means; if one of the first monitor means and the second monitor means detecting an abnormality of the second main signal, causing the second selection means to output the first switching command signal including second information, and causing the third selection means to change selection; and if one of the first monitor means and the second monitor means detecting second information in the second switching command signal, causing the first selection means and the first selection means to change selection.

Advantageous Effects of Invention

According to the above-mentioned aspects of the present invention, in a transmission system including a first route and a second route each of which has a redundant route, it is possible to switch only a route with a failure automatically from a currently used route to a redundant route when a failure occurs in one of the routes.

EXAMPLE EMBODIMENT

First Example Embodiment

Figure 1:
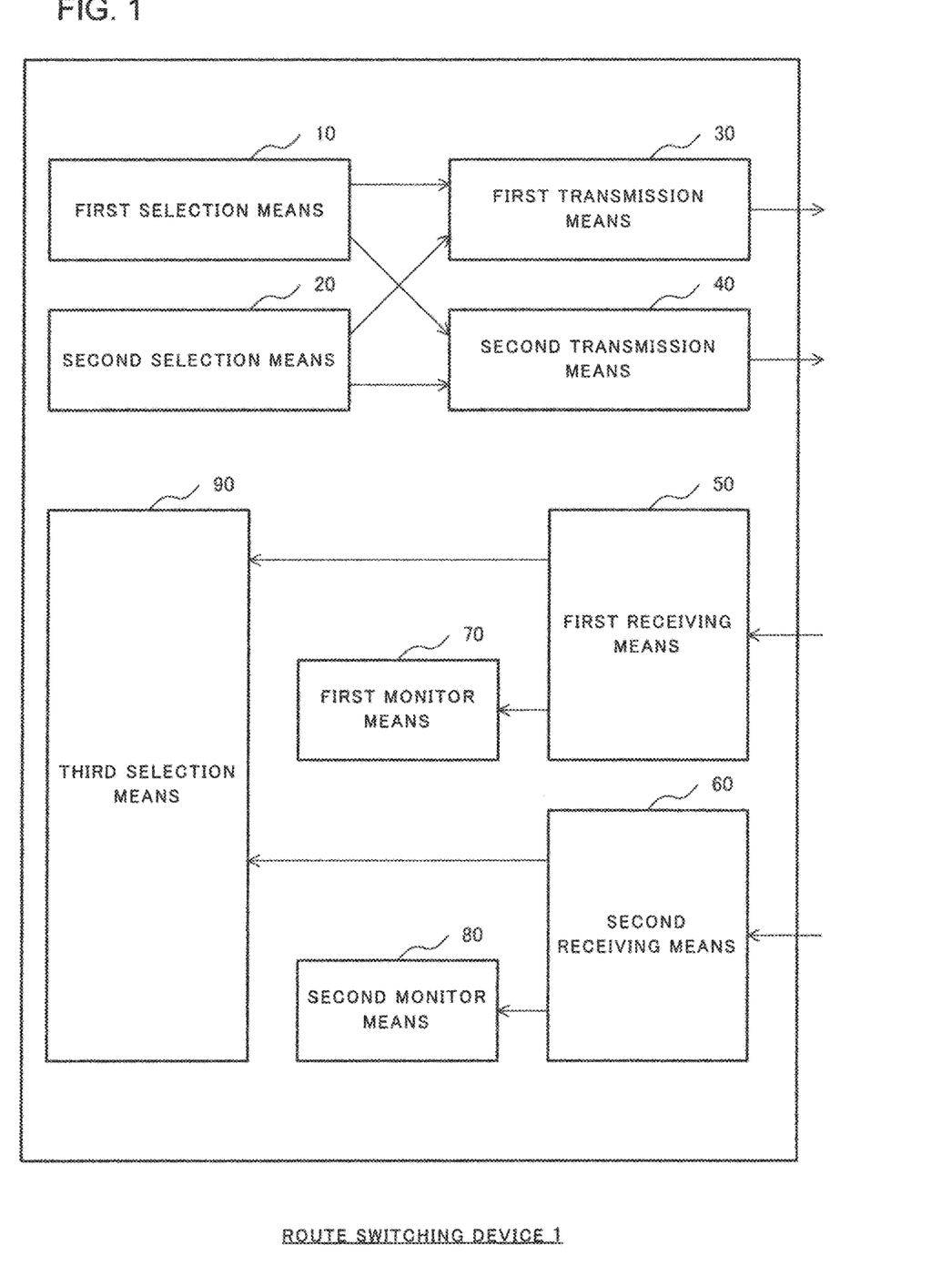
FIG. 1 is a block configuration diagram of a route switching device 1 according to a first example embodiment.

A first example embodiment of the present invention will be described. FIG. 1 illustrates a block configuration diagram of a route switching device according to the present example embodiment. In FIG. 1, a route switching device 1 includes a first selection means 10, a second selection means 20, a first transmission means 30, a second transmission means 40, a first receiving means 50, a second receiving means 60, a first monitor means 70, a second monitor means 80, and a third selection means 90.

The first selection means 10 selects one of the first transmission means 30 and the second transmission means 40, and outputs a first main signal to selected transmission means. In a normal state, the first selection means 10 according to the present example embodiment selects the first transmission means 30, and outputs the first main signal to the first transmission means 30 having been selected. The first selection means 10 changes a selection destination that is the first transmission means 30 or the second transmission means 40 when a first switching command notification is inputted from the monitor means 70, 80 to be described below.

The second selection means 20 selects one of the first transmission means 30 and the second transmission means 40, and outputs a first switching command signal to the selected transmission means. In the normal state, the second selection means 20 according to the present example embodiment selects the second transmission means 40, and outputs a first switching command signal including first information to the second transmission means 40 having been selected. The second selection means 20 outputs a first switching command signal including second information to a selected transmission means instead of outputting the first switching command signal including the first information to the selected transmission means when an abnormality notification is inputted from the monitor means 70, 80 to be described below. The second selection means 20 changes a selection destination that is the first transmission means 30 or the second transmission means 40 when the first switching command notification is inputted from the monitor means 70, 80 to be described below.

The first transmission means 30 transmits the first main signal or the first switching command signal that has been inputted, to a counterpart device that is not illustrated in FIG. 1. In the normal state, the first transmission means 30 according to the present example embodiment transmits the first main signal inputted from the first selection means 10 to the counterpart device. The main signal transmitted from the first transmission means 30 is transmitted to the counterpart device through a first route.

The second transmission means 40 transmits the first main signal or the first switching command signal that has been inputted, to the counterpart device that is not illustrated in FIG. 1. In the normal state, the second transmission means 40 according to the present example embodiment transmits the first switching command signal including the first information and inputted from the second selection means 20 to the counterpart device. The first switching command signal transmitted from the second transmission means 40 is transmitted to the counterpart device through a first redundant route.

The first receiving means 50 splits a second main signal or a second switching command signal that has been received from a counterpart device that is not illustrated in FIG. 1, into two signals, and outputs one of the split signals to the first monitor means 70 and the other signal to the third selection means 90. In the normal state, the first receiving means 50 according to the present example embodiment receives the second main signal from the counterpart device, and outputs one of two signals obtained by splitting the second main signal to the first monitor means 70 and the other signal to the third selection means 90. Here, a signal transmitted through a second route is inputted from the counterpart device into the first receiving means 50.

The second receiving means 60 splits the second main signal or the second switching command signal that has been received from the counterpart device into two signals, and outputs one of the split signals to the second monitor means 80 and the other signal to the third selection means 90. In the normal state, the second receiving means 60 according to the present example embodiment receives the second switching command signal from the counterpart device, and outputs one of two signals obtained by splitting the second switching command signal to the second monitor means 80 and the other signal to the third selection means 90. Here, a signal transmitted through a second redundant route is inputted from the counterpart device into the second receiving means 60.

The first monitor means 70 and the second monitor means 80 monitor the second main signal or the second switching command signal that has been inputted from each of the first receiving means 50 and the second receiving means 60. If the first monitor means 70 and the second monitor means 80 detect abnormalities of the second main signal having been inputted, they generate abnormality notification, and output the abnormality notification to the second selection means 20 and the third selection means 90. If the second information is included in the second switching command signal having been inputted, the first monitor means 70 and the second monitor means 80 generate first switching command notification, and output the first switching command notification to the first selection means 10 and the second selection means 20. In the normal state, the second main signal is inputted into the first monitor means 70, and the second switching command signal is inputted into the second monitor means 80.

The third selection means 90 selects one of the first receiving means 50 and the second receiving means 60, and obtains a signal inputted from the selected receiving means as the second main signal. In the normal state, the third selection means 90 according to the present example embodiment selects the first receiving means 50, and obtains a signal inputted from the first receiving means 50 as the second main signal. If the third selection means 90 receives input of the abnormality notification from the monitor means 70, 80, it changes a selection source that is the first receiving means 50 or the second receiving means 60.

Into the route switching device 1 configured as described above, if an abnormality occurs in the first route through which the first main signal is transmitted from the route switching device 1 to the counterpart device, the second switching command signal including the second information is inputted from the counterpart device via the second redundant route with the route being automatically switched from the first route to the first redundant route in the counterpart device. If the second switching command signal includes the second information, the route switching device 1 changes switching destinations in the first selection means 10 and the second selection means 20. This causes the route of the first main signal to be switched from the first route to the first redundant route.

On the other hand, if an abnormality occurs in the second route through which the second main signal is transmitted from the counterpart device to the route switching device 1, the route switching device 1 configured as described above transmits the first switching command signal including the second information to the counterpart device with a switching source of the third selection means 90 being changed due to an abnormality notification output from the first monitor means 70. This causes the route of the second main signal to be switched from the second route to the second redundant route with the route being switched from the second route to the second redundant route in the counterpart device.

As described above, if an abnormality occurs in the first route or the second route, it is possible for the route switching device 1 according to the present example embodiment to speedily switch the route with the abnormality to a redundant route by adding first information or second information to a switching command signal that is made to pass through the redundant route. That is to say, when the first main signal and the second main signal are transmitted using the first route and the second route each of which has a redundant route and a failure occurs in one of the routes, it is possible for the route switching device 1 according to the present example embodiment to automatically switch the route with the failure to the redundant route.

Second Example Embodiment

Figure 2:
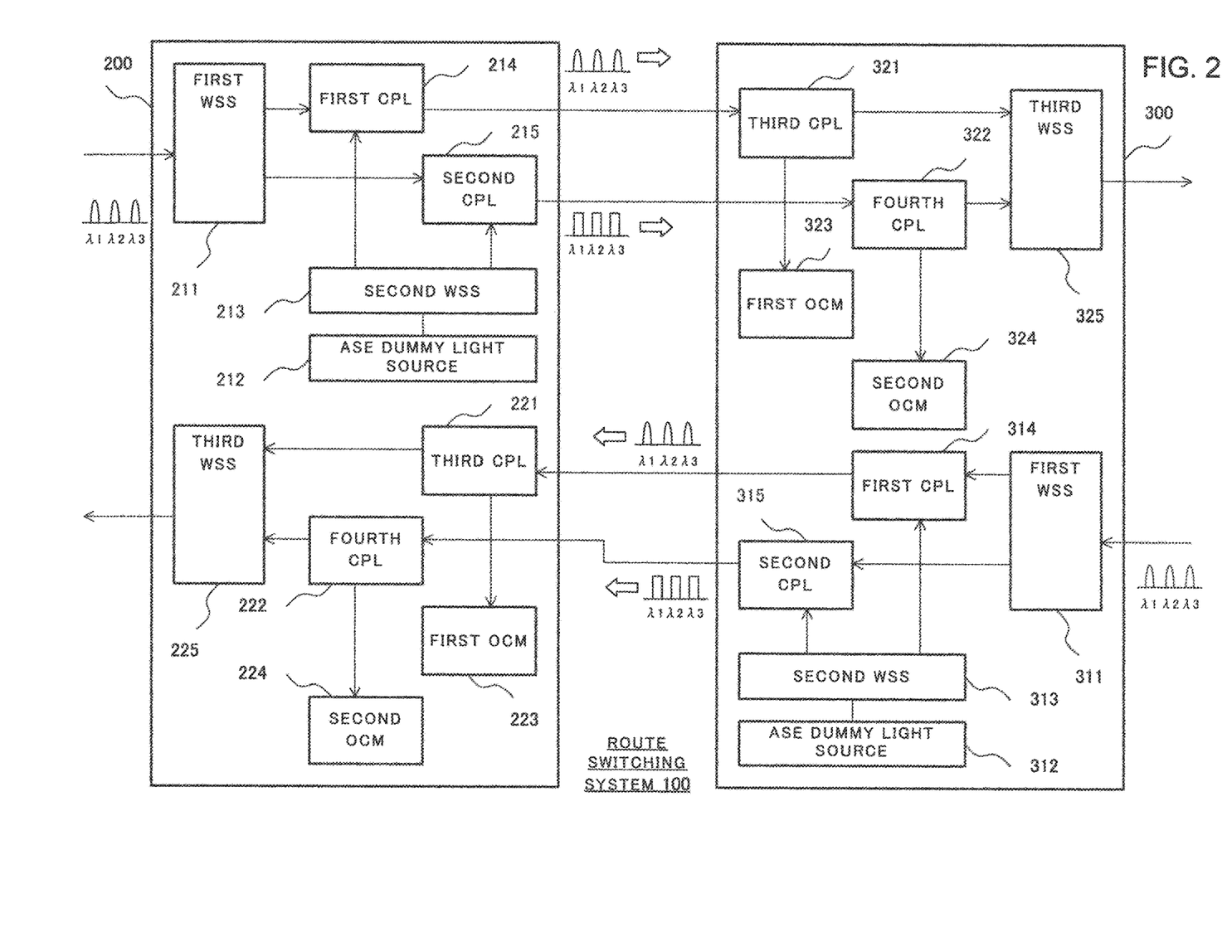
FIG. 2 is a system configuration diagram of a route switching system 100 according to a second example embodiment.

The second example embodiment will be described. FIG. 2 illustrates a system configuration diagram of a route switching system according to the present example embodiment. In FIG. 2, a route switching system 100 is composed of an A-station-side device 200 and a B-station-side device 300.

The A-station-side device 200 includes, as transmitting functions, a first wavelength selection switch (WSS) 211, an amplified spontaneous emission (ASE) dummy light source 212, a second WSS 213, a first coupler (CPL) 214, and a second CPL 215. The A-station-side device 200 also includes, as receiving functions, a third CPL 221, a fourth CPL 222, a first optical channel monitor (OCM) 223, a second OCM 224, and a third WSS 225.

The B-station-side device 300 is composed in the same manner as the A-station-side device 200. Specifically, the B-station-side device 300 includes, as transmitting functions, a first WSS 311, an ASE dummy light source 312, a second WSS 313, a first CPL 314, and a second CPL 315. The B-station-side device 300 also includes, as receiving functions, a third CPL 321, a fourth CPL 322, a first OCM 323, a second OCM 324, and a third WSS 325.

First of all, the transmitting functions of the A-station-side device 200 will be described. The transmitting functions of the B-station-side device 300 are performed in the same manner as the A-station-side device 200.

The first WSS 211 outputs a first main optical signal inputted from an A-station-side client to one of the first CPL 214 and the second CPL 215. In the present example embodiment, a first main optical signal obtained by multiplexing three optical signals having a wavelength $\lambda_1$, a wavelength $\lambda_2$, and a wavelength $\lambda_3$ is inputted from the A-station-side client into the first WSS 211; in a normal state, the first WSS 211 outputs the inputted first main optical signal to the first CPL 214.

If a first switching request notification is inputted from the second OCM 224 to be described below, the first WSS 211 switches an output destination of the first main optical signal from the first CPL 214 to the second CPL 215. Further, the first WSS 211 switches back to the previous output destination when a switching cancel notification is inputted from the second OCM 224 after switching the output destination of the first main optical signal.

The ASE dummy light source 212 generates amplified spontaneous emission (ASE) as a source of dummy light and outputs the generated ASE to the second WSS 213.

The second WSS 213 extracts predetermined wavelength light from the inputted ASE, and outputs dummy light for intensity adjustment and dummy light for switching command to the first CPL 214 and the second CPL 215. In the normal state, the second WSS 213 according to the present example embodiment extracts, from the ASE, an optical signal of wavelength $\lambda_4$ other than the wavelength $\lambda_1$, the wavelength $\lambda_2$, and the wavelength $\lambda_3$ that constitute a main signal, adjusts the light intensity of the optical signal with wavelength $\lambda_4$ in such a manner that the light intensity of a multiplexed optical signal to be output from the first CPL 214 will become equal to a predetermined intensity $P_0$, and outputs the adjusted optical signal to the first CPL 214 as dummy light for intensity adjustment. Adjusting the light intensity of the multiplexed optical signal to the predetermined intensity $P_0$ ensures amplification processing or the like in a relay device or the like that operates depending on light intensity.

Further, in the normal state, the second WSS 213 extracts, from the ASE, optical signals with the wavelength $\lambda_1$, the wavelength $\lambda_2$, and the wavelength $\lambda_3$ constituting the first main optical signal to be inputted from the A-station-side client. Then the second WSS 213 adds information indicating one of state 0 to state 2 to the extracted optical signal with the wavelength $\lambda_2$, adjusts the light intensity of the optical signals with the wavelength $\lambda_1$, the wavelength $\lambda_2$, and the wavelength $\lambda_3$ in such a manner that a total of the light intensity will become equal to the predetermined intensity $P_0$, and outputs the adjusted optical signals to the second CPL 215 as dummy light for switching command. Hereinafter, an optical signal with the wavelength $\lambda_2$ to which information indicating one of state 0 to state 2 is added is referred to as a switching information transmission signal. If a normality notification is inputted from the first OCM 223 to be described below, the second WSS 213 outputs, to the second CPL 215, dummy light for switching command including the switching information transmission signal to which information indicating state 0 is added. The switching information transmission signal will be described below.

If a first switching request notification is inputted from the second OCM 224, the second WSS 213 switches an output destination of the dummy light for intensity adjustment from the first CPL 214 to the second CPL 215, and switches an output destination of the dummy light for switching command from the second CPL 215 to the first CPL 214. If a switching cancel notification is inputted from the second OCM 224 after switching output destinations of the dummy light for intensity adjustment and the dummy light for switching command, the second WSS 213 switches back to the previous switching destination.

If an abnormality notification is inputted from the first OCM 223, the second WSS 213 determines whether or not an acknowledgement notification has been inputted from the second OCM 224. If the acknowledgement notification has been inputted, the second WSS 213 determines that a redundant route is functioning normally, and outputs, to the second CPL 215, the dummy light for switching command including a switching information transmission signal to which information indicating state 1 instead of state 0 is added. Inputting the dummy light for switching command including a switching information transmission signal to which the information indicating state 1 is added into the B-station-side device 300 via the second CPL 215, causes the output destination of the first main optical signal and the output destination of the dummy light for switching command to be switched in the first WSS 311 and the second WSS 313 of the B-station-side device 300.

If a switching completion notification has not been inputted from the third WSS 225 in spite of the fact that a predetermined time has passed after outputting the dummy light for switching command including a switching information transmission signal to which the information indicating state 1 is added, the second WSS 213 determines that the switching processing has failed. In this case, the second WSS 213 outputs, to the second CPL 215, dummy light for switching command including a switching information transmission signal to which the information indicating state 2 is added. Inputting the dummy light for switching command including the switching information transmission signal to which the information indicating state 2 is added into the B-station-side device 300, causes switching commands to the first WSS 311 and the second WSS 313 in the B-station-side device 300 to be cancelled.

Figure 3A:
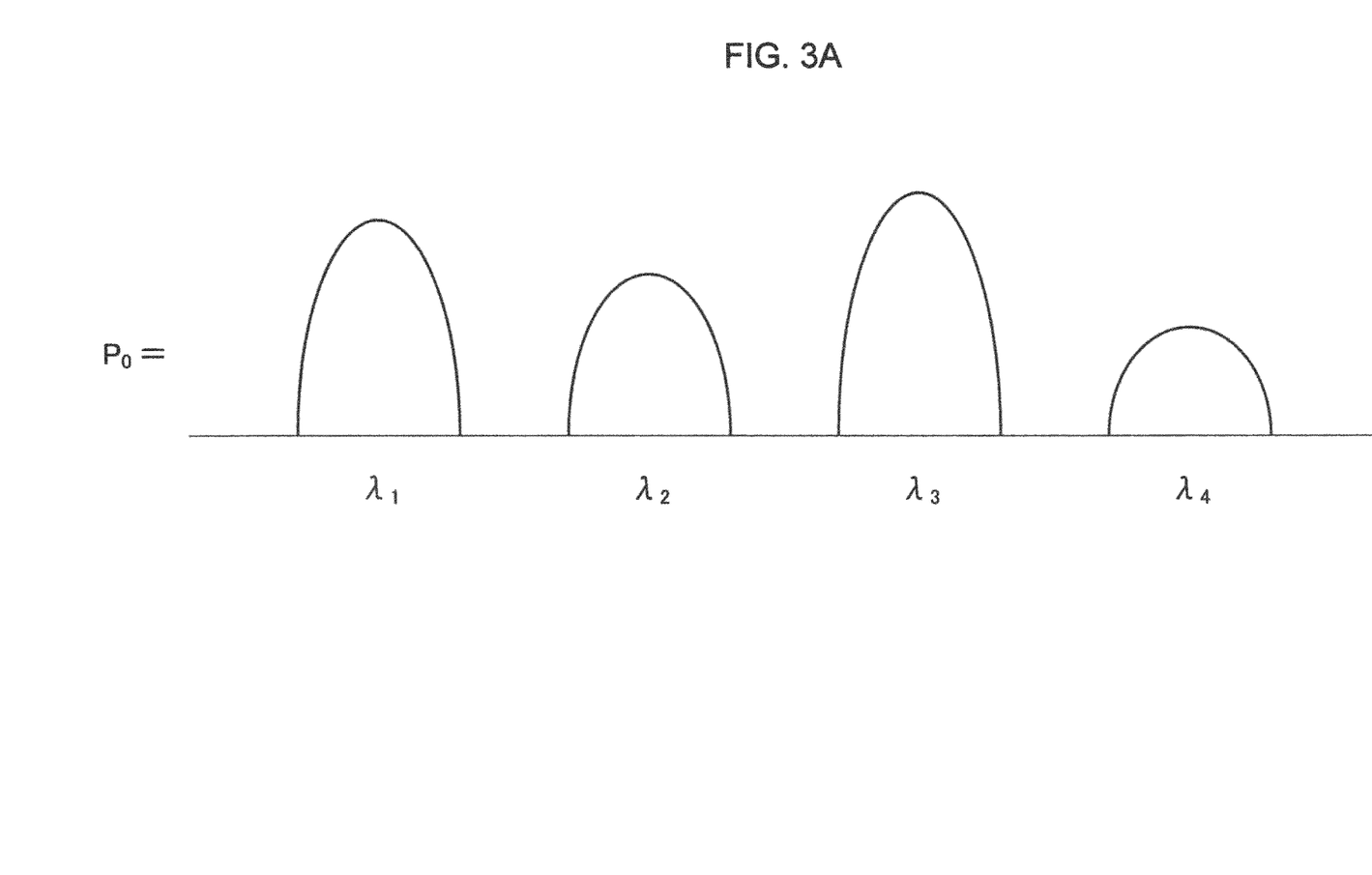
FIG. 3A is a wavelength spectrum of a multiplexed optical signal output from a first CPL 214 in a normal state.

In the normal state, the first CPL 214 multiplexes the first main optical signal (wavelength $\lambda_1$, wavelength $\lambda_2$, and wavelength $\lambda_3$) inputted from the first WSS 211 and the dummy light for intensity adjustment (wavelength $\lambda_4$) inputted from the second WSS 213, and transmits a multiplexed optical signal (wavelength $\lambda_1$, wavelength $\lambda_2$, wavelength $\lambda_3$, and wavelength $\lambda_4$) to the B-station-side device 300. By multiplexing the dummy light for intensity adjustment and the first main optical signal, the multiplexed optical signal (wavelength $\lambda_1$, wavelength $\lambda_2$, wavelength $\lambda_3$, and wavelength $\lambda_4$) with the light intensity equal to the predetermined intensity $P_0$ is output from the first CPL 214. FIG. 3A illustrates a wavelength spectrum of the multiplexed optical signal (wavelength $\lambda_1$, wavelength $\lambda_2$, wavelength $\lambda_3$, and wavelength $\lambda_4$) that is output from the first CPL 214 in the normal state.

Figure 3B:
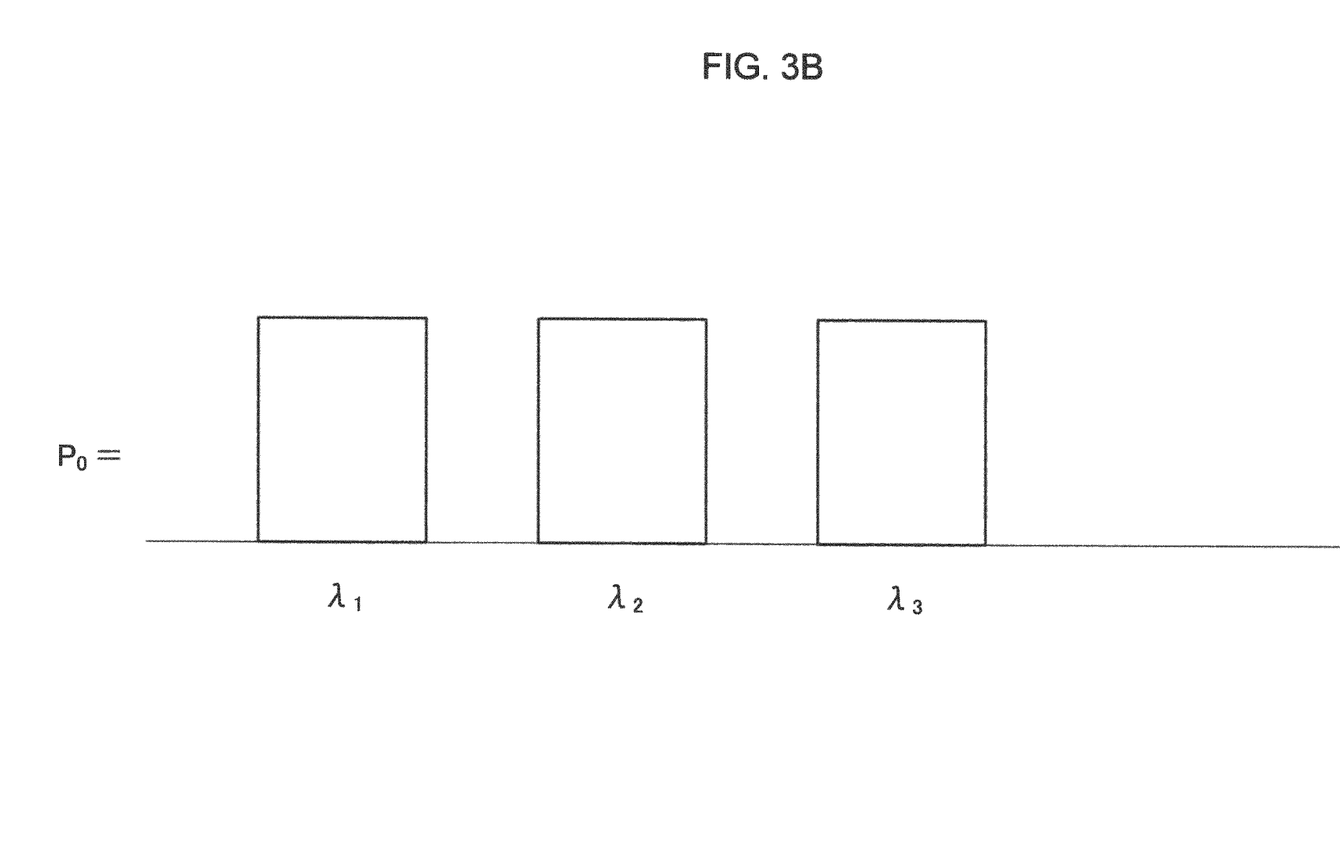
FIG. 3B is a wavelength spectrum of dummy light for switching command output from a second CPL 215 in a normal state.

In the normal state, the second CPL 215 transmits, to the B-station-side device 300 without change, the dummy light for switching command (wavelength $\lambda_1$, wavelength $\lambda_2$, and wavelength $\lambda_3$) inputted from the second WSS 213 and having total light intensity equal to the predetermined intensity $P_0$. FIG. 3B illustrates a wavelength spectrum of the dummy light for switching command (wavelength $\lambda_1$, wavelength $\lambda_2$, and wavelength $\lambda_3$) output from the second CPL 215 in the normal state.

As illustrated in FIG. 3A and FIG. 3B, the multiplexed optical signal having the light intensity equal to the predetermined the $P_0$ and the dummy light for switching command are output from the first CPL 214 and the second CPL 215. Adjusting the light intensity of the multiplexed optical signal and the light intensity of the dummy light for switching command to the predetermined intensity $P_0$, makes it possible to satisfy operating conditions in a relay device disposed on a transmission route between the A-station-side device 200 and the B-station-side device 300.

Next, the receiving functions of the A-station-side device 200 will described. The receiving functions of the B-station-side device 300 are performed in the same manner as the A-station-side device 200.

The third CPL 221 receives an optical signal transmitted from the first CPL 314 in the B-station-side device 300. The third CPL 221 splits the received optical signal into two signals and outputs the split signals to the first OCM 223 and the third WSS 225. In the normal state, a multiplexed optical signal including the second main optical signal (wavelength $\lambda_1$, wavelength $\lambda_2$, wavelength $\lambda_3$, and wavelength $\lambda_4$) is inputted into the third CPL 221.

The fourth CPL 222 receives an optical signal transmitted from the second CPL 315 in the B-station-side device 300. The fourth CPL 222 splits the received optical signal into two signals and outputs the split signals to the second OCM 224 and the third WSS 225. In the normal state, the dummy light for switching command (wavelength $\lambda_1$, wavelength $\lambda_2$, and wavelength $\lambda_3$) is inputted into the fourth CPL 222.

In the normal state, the first OCM 223 extracts the main optical signal (wavelength $\lambda_1$, wavelength $\lambda_2$, and wavelength $\lambda_3$) from the multiplexed optical signal (wavelength $\lambda_1$, wavelength $\lambda_2$, wavelength $\lambda_3$, and wavelength $\lambda_4$) inputted from the third CPL 221, and monitors whether or not the extracted main optical signal has any abnormality. If there is no abnormality in the main optical signal, the first OCM 223 outputs a normality notification to the second WSS 213. On the other hand, if an abnormality occurs in any one of the extracted optical signal of the wavelength $\lambda_1$, the extracted optical signal of the wavelength $\lambda_2$, and the extracted optical signal of the wavelength $\lambda_3$, the first OCM 223 outputs an abnormality notification to the second WSS 213. When the abnormality notification has been inputted into the second WSS 213, the dummy light for switching command including a switching information transmission signal to which the information indicating state 1 is added is transmitted to the B-station-side device 300.

In the normal state, the second OCM 224 extracts a switching information transmission signal with the wavelength $\lambda_2$ from the dummy light for switching command inputted from the fourth CPL 222, and obtains the information (state 0 to state 2) that is added to the switching information transmission signal. If the obtained information indicates state 0, the second OCM 224 generates an acknowledgement notification and outputs the acknowledgement notification to the second WSS 213. On the other hand, if the obtained information indicates state 1, the second OCM 224 generates a first switching request notification and outputs the first switching request notification to the first WSS 211 and the second WSS 213. The first switching request notification is inputted into the first WSS 211 and the second WSS 213, which causes an output destination of the main optical signal and output destinations of the dummy light for intensity adjustment and the dummy light for switching command to be switched. If a switching information transmission signal indicating state 2 has been inputted after outputting the first switching request notification, the second OCM 224 generates a switching cancel notification and outputs the switching cancel notification to the first WSS 211 and the second WSS 213. The switching cancel notification is inputted into the first WSS 211 and the second WSS 213, which causes the output destination of the main optical signal and the output destinations of the dummy light for intensity adjustment and the dummy light for switching command to be switched back to the previous output destinations.

Further, if an inputted optical signal is switched from the dummy light for switching command to the multiplexed optical signal (wavelength $\lambda_1$, wavelength $\lambda_2$, wavelength $\lambda_3$, and wavelength $\lambda_4$), the second OCM 224 outputs a second switching request notification to the third WSS 225. The second switching request notification is inputted into the third WSS 225, which causes a selection target in the third WSS 225 to be switched.

The third WSS 225 selects one of the third CPL 221 and the fourth CPL 222, extracts optical signals with the wavelength $\lambda_1$, the wavelength $\lambda_2$, and the wavelength $\lambda_3$ from the multiplexed optical signal (wavelength $\lambda_1$, wavelength $\lambda_2$, wavelength $\lambda_3$, and wavelength $\lambda_4$) inputted from the selected CPL, and outputs the extracted optical signals to the A-stations-side client as a second main optical signal received from a B-station-side client. In the normal state, the third WSS 225 selects the third CPL 221.

Further, if the second switching request notification has been inputted from the second OCM 224, the third WSS 225 switches a selection target from the third CPL 221 to the fourth CPL 222, and outputs a switching completion notification indicating that the switching has been completed to the second WSS 213.

In the present example embodiment, as mentioned above, the switching of the main signal or the dummy light is not performed by splitting the light using an optical coupler, but is performed by input-output on only one side using the optical switching function of the WSS. This differs from an optical switch in that the WSS is capable of selecting an output direction in terms of wavelength. Because the present example embodiment is premised on one-to-one switching, each number of input-output ports of a plurality of WSSs configuring the present example embodiment is set at one-to-two; however, if a route is switched between a plurality of routes, a WSS can be applied that has the number of ports by which those routes can be switched.

Figure 4:
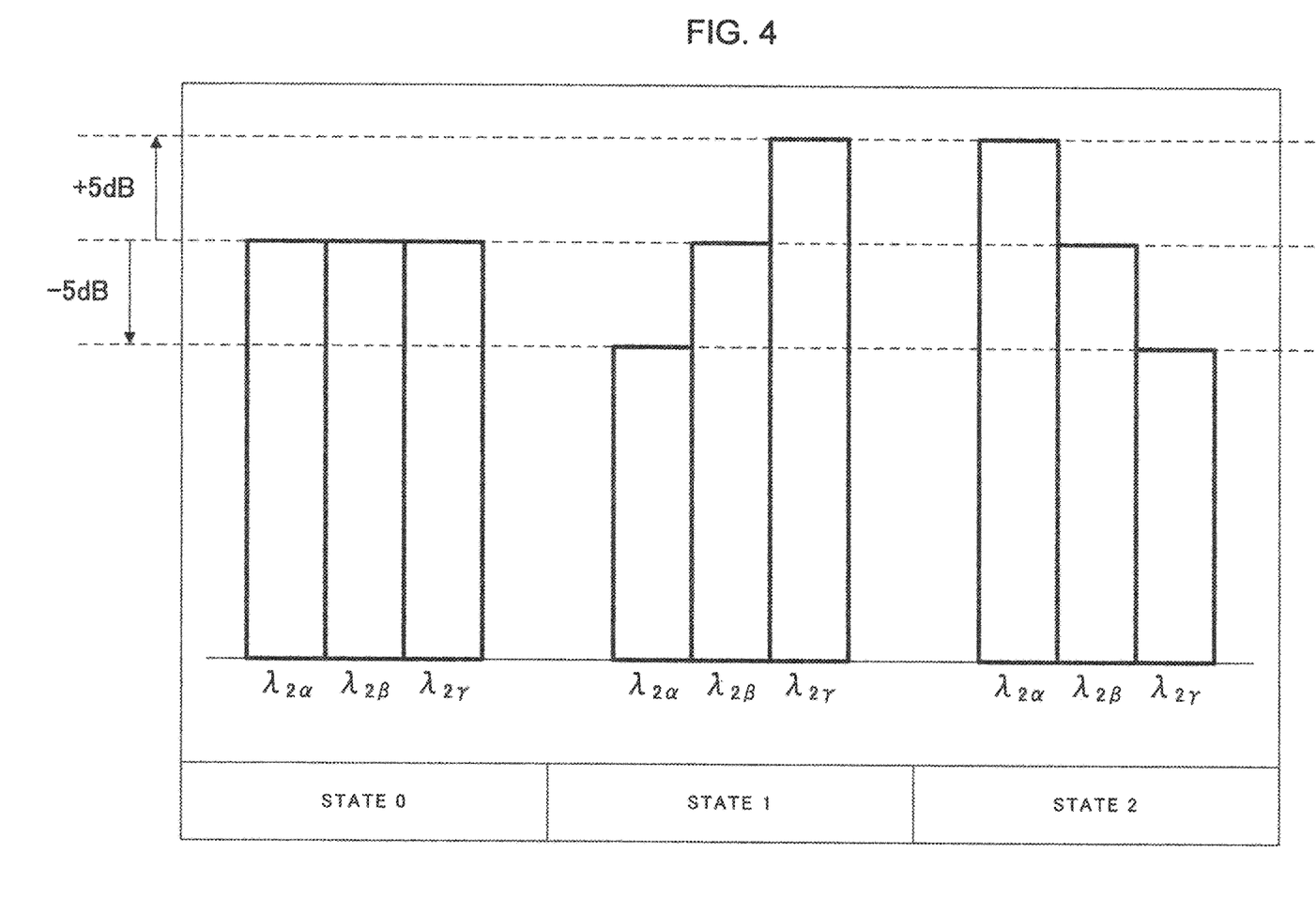
FIG. 4 is an example of a waveform of a switching information transmission signal generated in a second WSS 213 according to the second example embodiment.

Next, a switching information transmission signal constituting the dummy light for switching command will be described. FIG. 4 illustrates an example of a waveform of the switching information transmission signal. In an optical communication system to which a dense wavelength division multiplexing (DWDM) or the like is applied, a multiplexed optical signal having a grid from 12.5 GHz to 100 GHz is transmitted and received. FIG. 4 illustrates an example of a switching information transmission signal that is generated when a main optical signal of 37.5 GHz is handled.

As illustrated in FIG. 4, the switching information transmission signal with wavelength $\lambda_2$ is formed by three beams of the dummy light each of which has a predetermined grid. Specifically, the switching information transmission signal is formed by three optical signals with wavelength $\lambda_{2\alpha}$, wavelength $\lambda_{2\beta}$, and wavelength $\lambda_{2\beta}$ each of which has a grid of 10 GHz. It is possible to indicate one of state 0 to state 2 by shifting the light intensity of the optical signal with wavelength $\lambda_{2\alpha}$, the light intensity of the optical signal with wavelength $\lambda_{2\beta}$, and the light intensity of the optical signal with wavelength $\lambda_{2\gamma}$ by ±5 dB.

That is to say, as illustrated in FIG. 4, the light intensities of three beams of the dummy light have the same reference level, which indicates state 0. As illustrated in FIG. 4, the light intensity of the dummy light with wavelength $\lambda_{2\alpha}$ is smaller than a reference level by 5 dB, and the light intensity of the dummy light with wavelength $\lambda_{2\gamma}$ is larger than the reference level by 5 dB, which indicates state 1. As illustrated in FIG. 4, the light intensity of the optical signal with wavelength $\lambda_{2\alpha}$ is larger than the reference level by 5 dB, and the light intensity of the optical signal with wavelength $\lambda_{2\gamma}$ is smaller than the reference level by 5 dB, which indicates state 2.

The state 0 indicates that the route switching system 100 operates normally. The state 1 indicates a state in which an abnormality occurs in a transmission route from its own device to a counterpart device. The state 2 indicates a state in which switching a transmission route from its own device to a counterpart device has failed. The grid of the dummy light (10 GHz) and the light intensity difference (±5 dB) can be determined depending on the performance of the WSS or the OCM, and it is desirable to determine them taking into consideration a crosstalk or the like due to a long-haul transmission. The grid, the wavelength, a multiple value, or the like is appropriately set, which makes it possible to increase easily the number of states that the switching information transmission signal can indicate.

Next, the operations of the A-station-side device 200 and the B-station-side device 300 will be described using FIG. 5 when a failure occurs in a currently used route from the A-station-side device 200 to the B-station-side device 300 in the route switching system 100 configured above.

Figure 5:
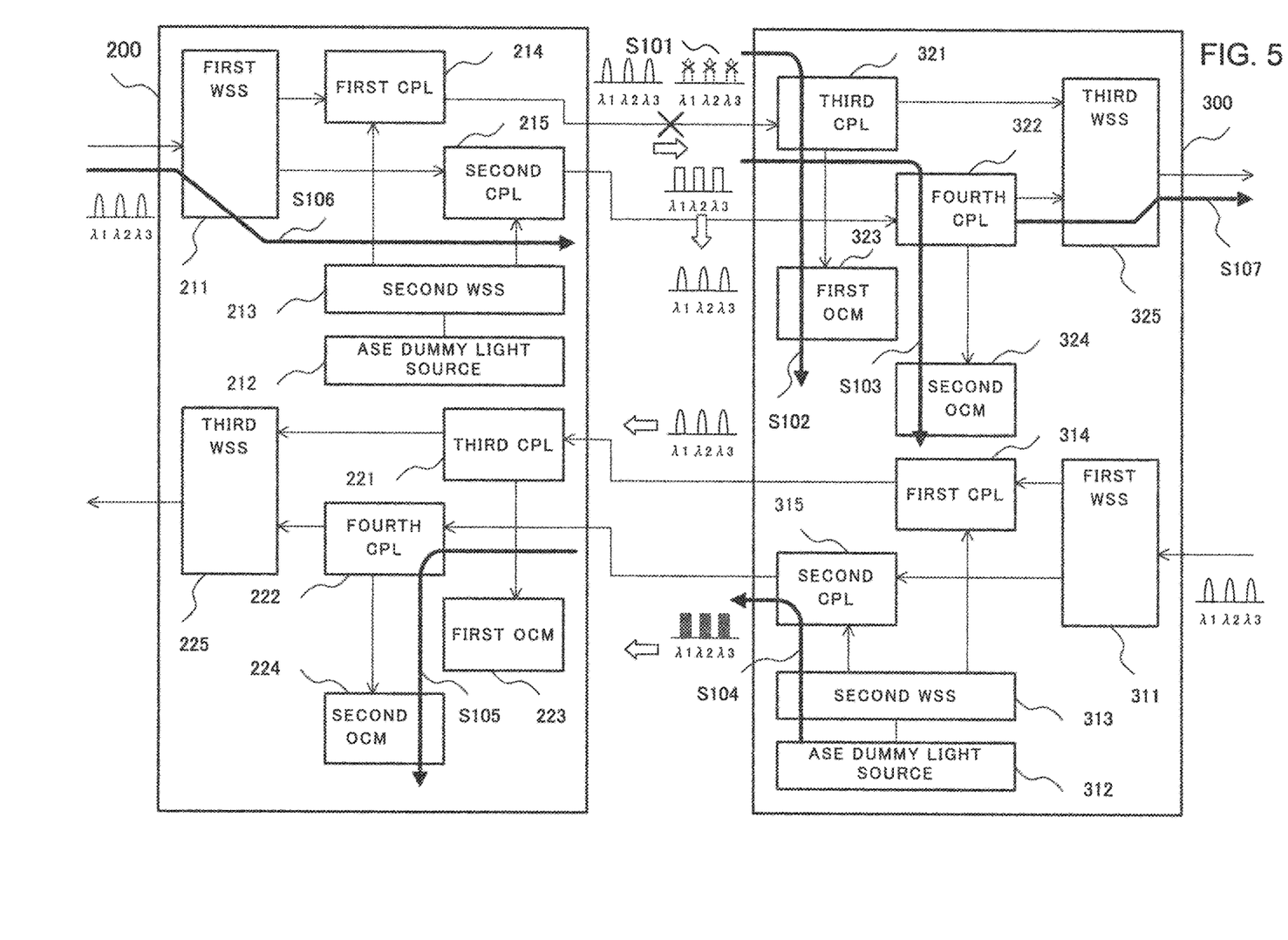
FIG. 5 is a diagram illustrating an operation procedure of an A-station-side device 200 and a B-station-side device 300 when a failure occurs in the route switching system 100 according to the second example embodiment.

In FIG. 5, when a failure occurs in a currently used route from the A-station-side device 200 to the B-station-side device 300 (S101), the first OCM 323 in the B-station-side device 300 detects an abnormality (S102). In this case, the first OCM 323 generates an abnormality notification and outputs the abnormality notification to the second WSS 313. When the abnormality notification has been inputted, the second WSS 313 determines whether or not an acknowledgement notification has been inputted from the second OCM 324 (S103). If the acknowledgement notification has been inputted, the second WSS 313 determines that a redundant route from the A-station-side device 200 to the B-station-side device 300 functions normally, and outputs, to the second CPL 315, the dummy light for switching command including a switching information transmission signal to which the information indicating state 1 is added. The dummy light for switching command including the switching information transmission signal to which the information indicating state 1 is added is inputted into the A-station-side device 200 via the second CPL 315 (S104).

Because the switching information transmission signal indicates state 1, the second OCM 224 in the A-station-side device 200 generates a first switching request notification and outputs the first switching request notification to the first WSS 211 and the second WSS 213 (S105). The first switching request notification is inputted to the first WSS 211 and the second WSS 213, which causes the output destination of the first main optical signal and the output destinations of the dummy light for intensity adjustment and the dummy light for switching command to be switched. Specifically, the first main optical signal (wavelength $\lambda_1$, wavelength $\lambda_2$, and wavelength $\lambda_3$) inputted from the A-station-side client is multiplexed with the dummy light for intensity adjustment (wavelength $\lambda_4$) in the second CPL 215, and a multiplexed optical signal (wavelength $\lambda_1$, wavelength $\lambda_2$, wavelength $\lambda_3$, and wavelength $\lambda_4$) is inputted into the fourth CPL 322 in the B-station-side device 300 (S106).

If the inputted optical signal is switched from the dummy light for switching command to the multiplexed optical signal, the second OCM 324 in the B-station-side device 300 outputs a second switching request notification to the third WSS 325. The second switching request notification has been inputted into the third WSS 325, which the selection target of the third WSS 325 to be switched from the third CPL 321 to the fourth CPL 322 (S107).

If the selection target in the third WSS 325 is switched to the fourth CPL 322 as soon as the first OCM 323 detects an abnormality, unwanted dummy light for switching command is output to the B-station-side client. In view of the above, in the present example embodiment, the selection target of the third WSS 325 is switched to the fourth CPL 322 after the second OCM 324 has confirmed that the inputted optical signal has switched from dummy light for switching command to the multiplexed optical signal.

When the switching to the fourth CPL 322 has been completed, the third WSS 325 outputs a switching completion notification to the second WSS 313. This makes it possible to recover the multiplexed optical signal transmission between the A-station-side device 200 and the B-station-side device 300.

If a switching completion notification has not been inputted from the third WSS 325 in spite of the fact that a predetermined time has passed after outputting the dummy light for switching command including a switching information transmission signal to which the information indicating state 1 is added, the second WSS 313 in the B-station-side device 300 determines that the switching processing has failed. In this case, the second WSS 313 outputs the dummy light for switching command including a switching information transmission signal to which the information indicating state 2 is added. The dummy light for switching command including a switching information transmission signal to which the information indicating state 2 is added has been inputted into the A-station-side device 200, which causes switching commands in the first WSS 211 and the second WSS 213 of the A-station-side device 200 to be cancelled. This allows the route switching system 100 having a redundant configuration to switch the A-station-side device 200 in conjunction with the B-station-side device 300.

The present invention has been described above with reference to the above-mentioned example embodiments as typical examples. However, the present invention is not limited to these embodiments. In other words, various forms understandable for those skilled in the art can be applied to the present invention without departing from the scope of the present invention.

REFERENCE SIGNS LIST

1 Route switching device
10 First selection means
20 Second selection means
30 First transmission means
40 Second transmission means
50 First receiving means
60 Second receiving means
70 First monitor means
80 Second monitor means
90 Third selection means
100 Route switching system
200 A-station-side device
211 First WSS
212 ASE dummy light source
213 Second WSS
214 First CPL
215 Second CPL
221 Third CPL
222 Fourth CPL 223 First OCM
224 Second OCM
225 Third WSS
300 B-station-side device
311 First WSS
312 ASE dummy light source
313 Second WSS
314 First CPL
315 Second CPL
321 Third CPL
322 Fourth CPL
323 First OCM
324 Second OCM
325 Third WSS

The invention claimed is:

1. An optical communication system including a first terminal and a second terminal, the optical communication system comprising:
   a first terminal device in the first terminal configured to transmit a first optical main signal to the second terminal via a first main line and transmit a first control optical signal to the second terminal via a first spare line; and
      a second terminal device in the second terminal configured to transmit a second optical main signal to the first terminal via a second main line and transmit a second control optical signal to the second terminal via a second spare line,
   wherein the first terminal device outputs the first optical main signal to the second terminal via the first spare line according to the second control optical signal
   wherein one of the first terminal device and the second terminal device includes:
   a first selection section configured to select one of a first transmission section and a second transmission section, and output the first optical main signal to a selected transmission section
   a second selection section configured to select one of the first transmission section and the second transmission section, and output the first control optical signal to a selected transmission section
   the first transmission section and the second transmission section configured to transmit an input signal to the second terminal;
   a first receiving section configured to split a signal received from the second terminal and output split signals to a first monitor section and a third selection section;
   a second receiving section configured to split a signal received from the second terminal and output split signals to a second monitor section and the third selection section;
   the first monitor section and the second monitor section configured to monitor the second optical main signal when the second optical main signal has been inputted, generate an abnormality notification and output the abnormality notification to the second selection section and the third selection section if an abnormality is detected, monitor the second control optical signal when the second control optical signal has been inputted, and generate a first switching command notification and output the first switching command notification to the first selection section and the second selection section if second information is included in the second control optical signal; and
   the third selection section configured to obtain the second optical main signal from a selected receiving section,
   wherein, in a normal state, the first selection section selects the first transmission section, the second selection section selects the second transmission section and outputs the first control optical signal including first information, and the third selection section selects the first receiving section,
   the first selection section switches a selection destination when the first switching command notification has been inputted,
   the second selection section outputs a switching command signal including second information when the abnormality notification has been inputted, and the second selection section switches a selection destination when the first switching command notification has been inputted, and
   the third selection section switches a selection source when the abnormality notification has been inputted.

2. The optical communication system according to claim 1,
   wherein the second monitor section generates a switching cancel notification and outputs the switching cancel notification to the first transmission section and the second selection section if third information is included in the second switching command signal, and
   the first selection section and the second selection section switch back selection of transmission section to previous positions if the switching cancel notification is inputted.

3. The optical communication system according to claim 2,
   wherein the second selection section causes one of the first information, the second information, and the third information to be included in the switching command signal by changing a waveform of the first switching command signal.

4. The optical communication system according to claim 2,
   wherein the first monitor section generates a normality notification and outputs the normality notification to the second selection section if a monitor result of the second optical main signal is normal, and
   the second selection section outputs a first switching command signal including the first information when the normality notification has been inputted.

5. The optical communication system according to claim 2,
   wherein the first monitor section outputs the abnormality notification only to the second selection section,
   the second monitor section generates a second switching command notification and outputs the second switching command notification to the third selection section if the second switching command signal is replaced by the second optical main signal, and
   the third selection section switches selection from the first receiving section to the second receiving section when the second switching command notification has been inputted.

6. The optical communication system according to claim 1,
   wherein the second selection section causes one of the first information, the second information, and the third information to be included in the switching command signal by changing a waveform of the first switching command signal.

7. The optical communication system according to claim 6, wherein the first monitor section generates a normality notification and outputs the normality notification to the second selection section if a monitor result of the second optical main signal is normal, and the second selection section outputs a first switching command signal including the first information when the normality notification has been inputted.

8. The optical communication system according to claim 6, wherein the first monitor section outputs the abnormality notification only to the second selection section, the second monitor section generates a second switching command notification and outputs the second switching command notification to the third selection section if the second switching command signal is replaced by the second optical main signal, and the third selection section switches selection from the first receiving section to the second receiving section when the second switching command notification has been inputted.

9. The optical communication system according to claim 1 wherein the first monitor section generates a normality notification and outputs the normality notification to the second selection section if a monitor result of the second optical main signal is normal, and the second selection section outputs a first switching command signal including the first information when the normality notification has been inputted.

10. The optical communication system according to claim 9, wherein the first monitor section outputs the abnormality notification only to the second selection section, the second monitor section generates a second switching command notification and outputs the second switching command notification to the third selection section if the second switching command signal is replaced by the second optical main signal, and the third selection section switches selection from the first receiving section to the second receiving section when the second switching command notification has been inputted.

11. The optical communication system according to claim 1 wherein the first monitor section outputs the abnormality notification only to the second selection section, the second monitor section generates a second switching command notification and outputs the second switching command notification to the third selection section if the second switching command signal is replaced by the second optical main signal, and the third selection section switches selection from the first receiving section to the second receiving section when the second switching command notification has been inputted.

12. The optical communication system according to claim 1 wherein the second selection section adjusts a light intensity of the first switching command signal to become equal to a predetermined value P and outputs an adjusted first switching command signal to the selected transmission section, and generates a signal for light intensity adjustment and outputs the signal for light intensity adjustment to transmission section to which the first switching command signal is not output, and the signal for light intensity adjustment is multiplexed with the first optical main signal, and is transmitted to the counterpart device as a multiplexed optical signal having a light intensity equal to the predetermined value P.

13. The optical communication system according to claim 1, wherein the first optical main signal transmitted from the first transmission section in the first route switching device is received by the first receiving section in the second route switching device through a first route, the first control optical signal transmitted from the second transmission section in the first route switching device is received by the second receiving section in the second route switching device through a first redundant route, the second optical main signal transmitted from the first transmission section in the second route switching device is received by the first receiving section in the first route switching device through a second route, and the second control optical signal transmitted from the second transmission section in the second route switching device is received by the second receiving section in the first route switching device through a second redundant route.

14. The optical communication system according to claim 1, wherein the second monitor section generates a switching cancel notification and outputs the switching cancel notification to the first transmission section and the second selection section if third information is included in the second switching command signal, and the first selection section and the second selection section switch back selection of transmission section to previous positions if the switching cancel notification is inputted.

15. The optical communication system according to claim 1, wherein the first monitor section generates a normality notification and outputs the normality notification to the second selection section if a monitor result of the second optical main signal is normal, and the second selection section outputs a first switching command signal including the first information when the normality notification has been inputted.

16. The optical communication system according to claim 1, wherein the first monitor section outputs the abnormality notification only to the second selection section, the second monitor section generates a second switching command notification and outputs the second switching command notification to the third selection section if the second switching command signal is replaced by the second optical main signal, and the third selection section switches selection from the first receiving section to the second receiving section when the second switching command notification has been inputted.

17. An optical communication system including a first terminal and a second terminal, the optical communication system comprising:

a first terminal device in the first terminal configured to transmit a first optical main signal to the second terminal via a first main line and transmit a first control optical signal to the second terminal via a first spare line; and a second terminal device in the second terminal configured to transmit a second optical main signal to the first terminal via a second main line and transmit a second control optical signal to the first terminal via a second spare line, wherein the first terminal device outputs the first optical main signal to the second terminal via the first spare line according to the second control optical signal.

18. A method for transmitting optical signals, comprising:

transmitting a first optical main signal from a first terminal to a second terminal via a first main line;

transmitting a first control optical signal from a first terminal to the second terminal via a first spare line;

transmitting a second optical main signal from the second terminal to the first terminal via a second main line; and transmitting a second control optical signal from the second terminal to the first terminal via a second spare line; and changing a line through which the first optical main signal is transmitted from the first main line to the first spare line, according to the second control optical signal.

* * * * *

UNITED STATES PATENT AND TRADEMARK OFFICE
CERTIFICATE OF CORRECTION

PATENT NO. : 10,505,660 B2
APPLICATION NO. : 15/743299
DATED : December 10, 2019
INVENTOR(S) : Tetsuya Yamamoto Page 1 of 1

It is certified that error appears in the above-identified patent and that said Letters Patent is hereby corrected as shown below:

In the Specification

Column 10, Example Embodiment, Line 56; Delete "$\lambda_{2\beta}$" and insert --$\lambda_{2\gamma}$-- therefor In the Claims Column 17, Line 13; In Claim 18, after "line;", delete "and"

Signed and Sealed this
Fifteenth Day of September, 2020

Andrei Iancu
*Director of the United States Patent and Trademark Office*